ELDRED H. PAUFVE
ROBERT B. GREENLY
FRANK P. LEWANDOWSKI
INVENTORS

ELDRED H. PAUFVE
ROBERT B. GREENLY
FRANK P. LEWANDOWSKI
INVENTORS

BY

ATTORNEY

ELDRED H. PAUFVE
ROBERT B. GREENLY
FRANK P. LEWANDOWSKI
INVENTOR

Dec. 6, 1966 E. H. PAUFVE ET AL 3,290,651

CHARACTER RECOGNITION SYSTEM EMPLOYING CHARACTER DATA DIGITIZER AND BLACK AND WHITE DATA DIODE MEMORY ARRAY

Original Filed Oct. 17, 1961 6 Sheets-Sheet 5

ELDRED H. PAUFVE
ROBERT B. GREENLY
FRANK P. LEWANDOWSKI
INVENTORS

BY

ATTORNEY

United States Patent Office 3,290,651
Patented Dec. 6, 1966

3,290,651
CHARACTER RECOGNITION SYSTEM EMPLOYING CHARACTER DATA DIGITIZER AND BLACK AND WHITE DATA DIODE MEMORY ARRAY

Eldred H. Paufve, Susquehanna, Pa., and Robert B. Greenly, Binghamton, and Frank P. Lewandowski, Johnson City, N.Y., assignors, by mesne assignments, to Character Recognition Corporation, Binghamton, N.Y., a corporation of Delaware Original application Oct. 17, 1961, Ser. No. 149,144. Divided and this application Dec. 23, 1965, Ser. No. 515,815
18 Claims. (Cl. 340—146.3)

This is a division of our co-pending application Serial No. 149,144, filed October 17, 1961. This invention relates to optical reading or character recognition apparatus which will recognize graphic data, such as printed or typewritten characters by photo-electric sensing, and provide suitable output signals to operate computers, printers and other data-processing devices. Some features of the invention are of even wider utility and can be used to advantage in other character recognition apparatus, such as magnetic character recognition apparatus.

Briefly and generally described, one embodiment of the invention utilizes a reading head comprised of a vertical row of photocells which are scanned sequentially to produce digitized pulse trains characteristic of the individual character as the characters themselves or character images are passed under the reading head. Automatic means are provided to adjust for proper vertical and horizontal registry of each character, or to tolerate lacks in such registration, and to disregard blurred or fuzzy edges of the characters being scanned. Reference pulse trains indicative of the various characters which might be encountered are stored in a magnetic drum memory in one embodiment (or in a memory provided by connections of diode matrices in an alternative embodiment). The character being scanned at any given instant is compared with the various characters in the memory, and error pulses are tallied relative to each of the characters in the memory. At the end of the pulse train of each character being read, the net error tally in each character channel is interrogated, and the channel having the least error thereby identified, so that the output signal from the channel may actuate an appropriate readout device. If characters other than those contained in the machine vocabulary are expected to be encountered in the material to be presented to the machine, an error count threshold may be used to prevent incorrect recognition. When all stored characters differ from the sampled character by too much, the invention no longer selects the most likely characters, but indicates a misread, and either stops the machine or signals to the operator, so that the machine operator may identify the character.

One object of the invention is to provide improved character recognition apparatus which will compare a character being scanned to provide electrical pulses with a plurality of stored or reference characters, and which will identify the character being scanned as that reference character from which it least differs, unless it differs by a predetermined excessive amount, in which case a misread signal is provided.

It is another object of the invention to provide an improved symbol digitizer which tends to ignore blurred or fuzzy leading edges of characters being scanned, thereby providing more reliable pulse trains characteristic of scanned symbols.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
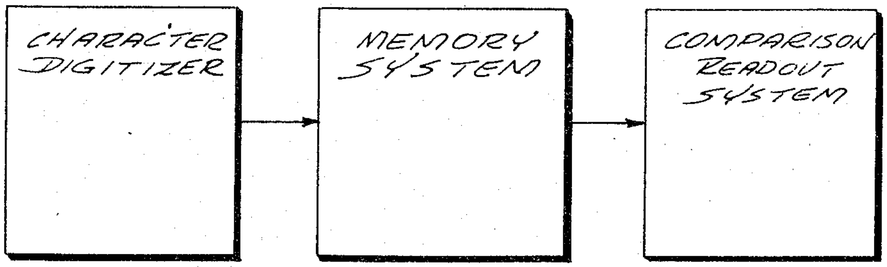
FIG. 1 is a simple block diagram of the invention in which the entire apparatus is grouped into three major sections.

The first and the alternative embodiments of the present invention each comprise three main portions, as illustrated by the block diagram of FIG. 1. The function of the character digitizer, which may be constructed largely the same in either embodiment and which is useful in various other data scanning equipment, is to scan the sample character being read and to produce a pulse train, preferably bi-valued, characteristic of the sample character. The principal function of the memory system is to present, simultaneously or successively, a plurality of stored or reference pulse trains, each train being characteristic of an individual alphanumeric character. Two widely differing memory systems are shown in the two embodiments illustrated herein. The embodiment of FIG. 3, believed to be particularly applicable to small-scale vocabulary installations, uses diode matrix memory apparatus to provide permanent storage. This embodiment follows in many respects the teachings of an invention claimed in application Serial No. 831,599 filed August 4, 1959 by Harold S. Hemstreet. The alternative embodiment of FIGS. 7 and 8 uses a magnetic drum for its basic memory storage (permanent storage) and, in addition, two shift registers for temporary information storage. This latter embodiment is believed to be particularly well suited for large-scale installations requiring either storage of a large vocabulary of characters or rapid or frequent changing of the vocabulary. This embodiment follows in many respects the teachings of another invention shown in the Hemstreet application. The third portion of the invention, the comparison readout system, operates to determine and designate which of the characters stored in the memory has just been scanned. It does this by keeping individual tallies of difference data arising from the differences between bits of the sample character being viewed and each of the reference characters stored in the memory system. As the viewing of a character is completed the various tallies of difference pulses are interrogated, and in general, the character having the smallest tally of error or difference is then designated as the one having been viewed.

*Character digitizer*

The character digitizer breaks up the sample character being scanned into black and white bits by scanning across the character both vertically and horizontally. While a variety of equivalent optical systems may be substituted, the invention may utilize a light source which projects an intense, fairly uniform beam of light over the vertical slit area viewed by the reading head. The light reflected from the slit is imaged by a projection lens onto a vertical row of photo-sensitive means which are arranged in a vertical row to comprise the reading head. A horizontally adjustable aperture may be provided to adjust scanning resolution in a horizontal sense. Vertical resolution is determined by the number of, i.e., spacing, of the photocells used in the vertical row. Vertical scanning is accomplished electronically by sequentially sampling the output currents of the photocells. Horizontal scanning is done at a relatively slower rate by lateral movement at constant speed of the document containing the character under the stationary reading head. In certain applications, such as the reading of successive vertically disposed digits in a column on a conventional cash register tape, it may be desirable instead to move the tape vertically and to arrange the successively-sampled photocells in a horizontal row. In the specific embodiment to be described in detail, eight photocells are arranged in a vertical column, with six normally used for viewing the character, with one above and one below the normal character area to accommodate changes or deviation in vertical registration. The characters are advanced laterally past the reading head at a rate so related to the vertical scanning rate that ten scans are provided across a typical alphanumeric character, although the number of scans depends upon the width of the character being scanned. Assuming ten scans are made, however, which is usual for many characters, only five (even-numbered) of the ten scans will be used to supply recognition data, the initial scan only to provide starting signals, and the 3rd and higher odd-numbered scans are unused. Narrow characters may be scanned vertically only six times, for example, and of the six vertical scans only the second, fourth and sixth would be used for recognition.

Figure 4:
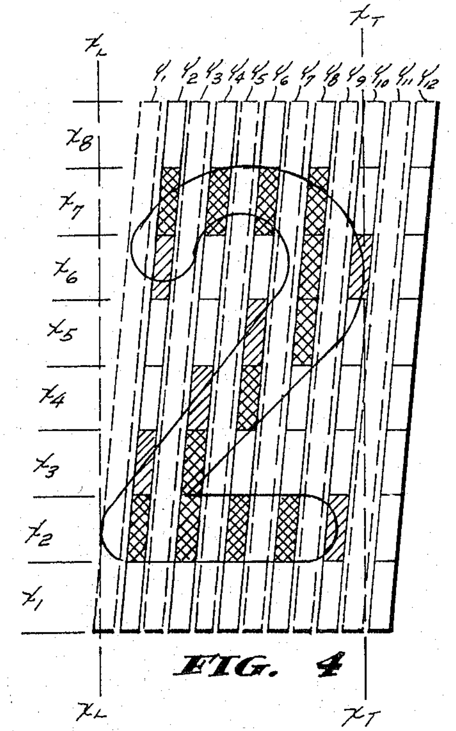
FIG. 4 is a geometrical diagram illustrating how the apparatus may scan the sample numeral "2" useful in understanding how the invention tends to avoid errors frequently caused in other devices when the sample character presented to the digitizer is not accurately located within the scanning area.

The typical scanning diagram shown in FIG. 4, which shows the character digitizer scanning raster superimposed on a numeral "2," will be useful in understanding operation of the invention. The numeral "2" is shown therein located in an area or scanning field which is eight zones high by twelve zones wide. Each zone is shown slightly narrowed in FIG. 4 for sake of clarity. The width of each zone actually corresponds to the effective width of the slit or aperture interposed between the document and the photo-sensitive elements of the reading head. The height of any zone corresponds to the vertical length of the portion of the slit which is imaged on its associated photo-diode. Although the photodiodes (PX–1 to PX–8) of the reading head are aligned in a straight line along the vertical or X direction, the simultaneous lateral translation or transporting of the documents bearing characters perpendicularly, in the horizontal direction, while vertical scanning progresses, causes each scanning path effectively to be canted relative to the character, as in the manner shown, at an angle whose tangent is proportional to the horizontal transport velocity of the document divided by the vertical scanning velocity. Scanning proceeds upwardly and to the right in the pattern of FIG. 4, beginning at zone $X_1Y_1$ in the lower left hand corner, first proceeding upwardly through all the $Y_1$ zones, then beginning upwardly through each of the $Y_2$ zones, etc. It is by no means necessary that scanning progress in that specific manner, as will be apparent. Also, in some embodiments of the invention various optical elements may be used to invert scanning direction.

As will be explained in detail, only the even-numbered scans are used for recognition in the specific embodiment shown. The areas covered by the odd-numbered scans are shown in dashed lines in FIG. 4 and identified as $Y_1$, $Y_3$, $Y_5$, $Y_7$, $Y_9$ and $Y_{11}$, while the intermediate areas covered by the even-numbered scans are shown by solid outline strips $Y_2$, $Y_4$, $Y_6$, $Y_8$, $Y_{10}$ and $Y_{12}$.

The number of vertical scans made, and consequently the number used for recognition, will depend in part on the nature of the characters or other graphic data scanned, since the scanning system resets and prepares for a succeeding or new character at any time it finds that no "black" has been seen for a predetermined length of time. For example, if the black area of a narrow character being viewed covers only a small portion at the left side of the scanning field, within strips $Y_1$ to $Y_4$ for example, the scanning would be interrupted after those few scans had been made. On the other hand, if a very wide character extends completely across the scanning field, additional vertical scans will continue (with a maximum of sixteen allowed in the embodiment shown), with the data derived from each alternate scan being used for identification.

The portion of the scanning field observed by each photodiode is indicated by a corresponding X zone marking in FIG. 4, wherein lower photodiode PX–1 observes the $X_1$ zones, photodiode PX–2 the $X_2$ zones etc.

Figure 2:
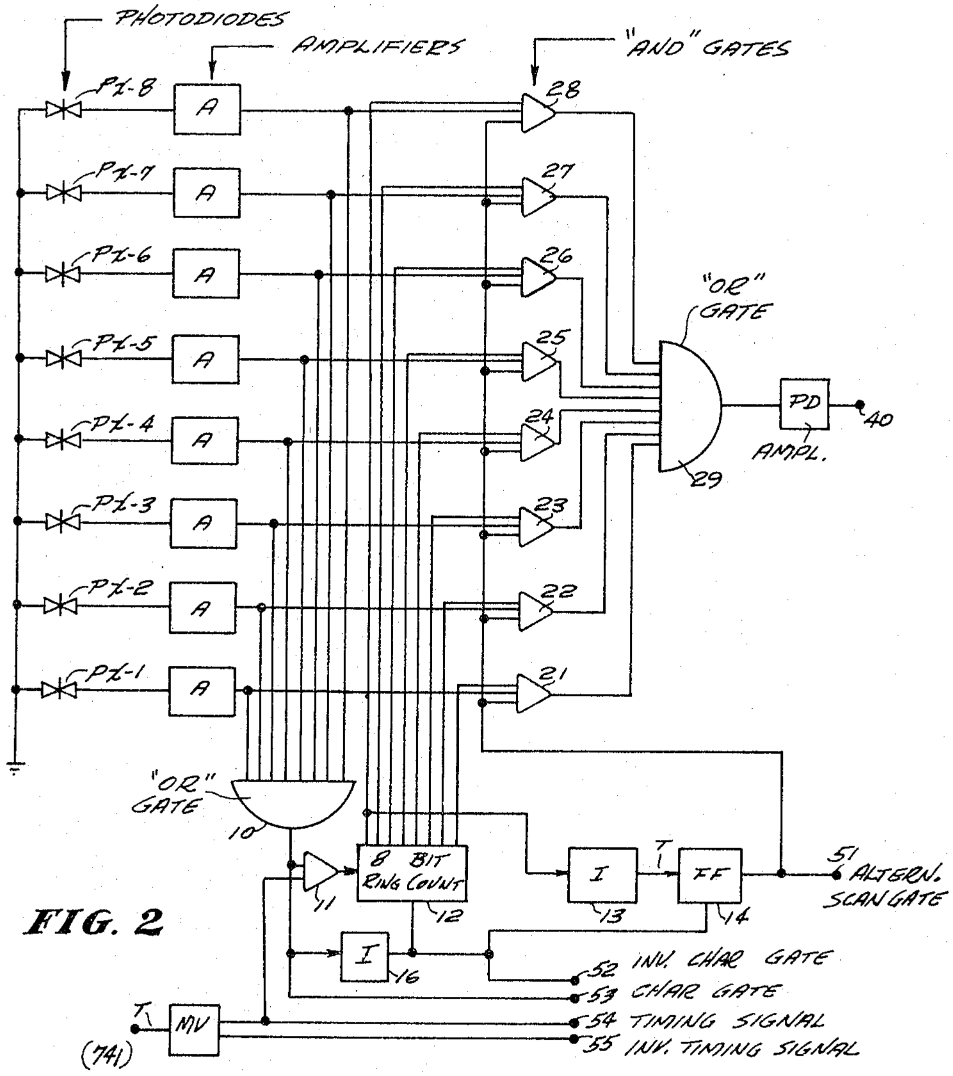
FIG. 2 is a schematic diagram of an improved character digitizer constructed in accordance with the invention. The function of the character digitizer is to sense successive characters (presented by mechanical document feed means not shown) and to provide pulse trains characteristic of the characters presented.

A better understanding of the operation of the character digitizer may be facilitated by reference to FIG. 2. As a character on a document being transported past the reading head is advanced into the reading area, some leading point or leading edge of black eventually will actuate one or more of the eight photodiodes shown, providing a voltage signal from the photodiode, which is amplified in an associated amplifier and fed through conventional OR circuit 10. Because no vertical scanning is taking place prior to the time at which a part of a character is viewed, but instead all eight photodiodes are continuously viewing the document and applying their signals to OR gate 10, there is no cant to the lines $X_L$—$X_L$ which define the leading edge of the character and $X_T$—$X_T$ which defines the trailing edge of the character. In the example shown in FIG. 4, initial scan $Y_1$ will be seen to intercept the numeral "2" first at the $X_2$ zone along its leading edge, so that "start" signals will be generated by photodiode PX–2 as soon as it "sees" the leading edge of the character. Since the $X_2$, $X_6$ and $X_7$ zones each contain some "black" of the numeral "2" during the $Y_1$ scan, photodiodes PX–2, PX–6 and PX–7 each will provide input signals to OR circuit 10 during the initial ($Y_1$) vertical scan. The initial signal from PX–2 will serve to start the sequentials scanning of the photodiode output signals by activating character gate 11, a conventional AND gate, which routes input clock or trigger pulses from multivibrator MV to advance, or step, ring counter 12. The clock pulses from timing signal source MV will continue to step counter 12 as long as any "block" is being viewed by any one or more of the reading head photocells, and upon complete passage of all of the "black" of the character, the absence of any input to AND gate 11 from OR gate 10 will disable AND gate 11, discontinuing the cycling of counter 12. Output signals from successive higher order stages of counter 12 are connected to AND gates 21–28 with respective signals from the eight photodiodes, so that the gates are individually and successively opened and closed as the counter is stepped upwardly through its cycle. The sequential signals from AND gates 21–28 then are combined through OR gate 29 to produce on one line a single sequential pulse train characteristic of the character being scanned. It may be noted that during the $Y_1$ initial scan particularly, and also during all successive *odd-numbered* scans, the amplified photodiode outputs are not admitted to OR gate 29, because the absence during odd scans of an alternate scan signal applied to AND gates 21–28 from line 51 keeps these gates closed during odd numbered scans.

As the reading head completes viewing the character, so that no "black" is seen by any of the photodiodes, character AND gate 11 closes. In some embodiments of the invention, a slight delay or lag may be desirably incorporated into the circuits of AND gate 11 and inverter 16 to tend to avoid resetting counter 12 during the scan of a character having much "white" area between its left and right ends. The output signal from OR gate 10 is termed the character gate signal, since it remains energized for the entire scanning period of a single character and thereby defines the scanning period. It is important to recognize that the character gate signal obtains at all times that *any* photodiode of the *entire column* views black, and not merely only when the particular photodiode being sampled at one instant views black. Thus, if a character has continuous black area from its leading edge to its trailing edge, as most alphanumeric characters do, the character gate signal lasts as long as, and only so long as the character is passing under the slit area viewed by the reading head.

Figure 3:
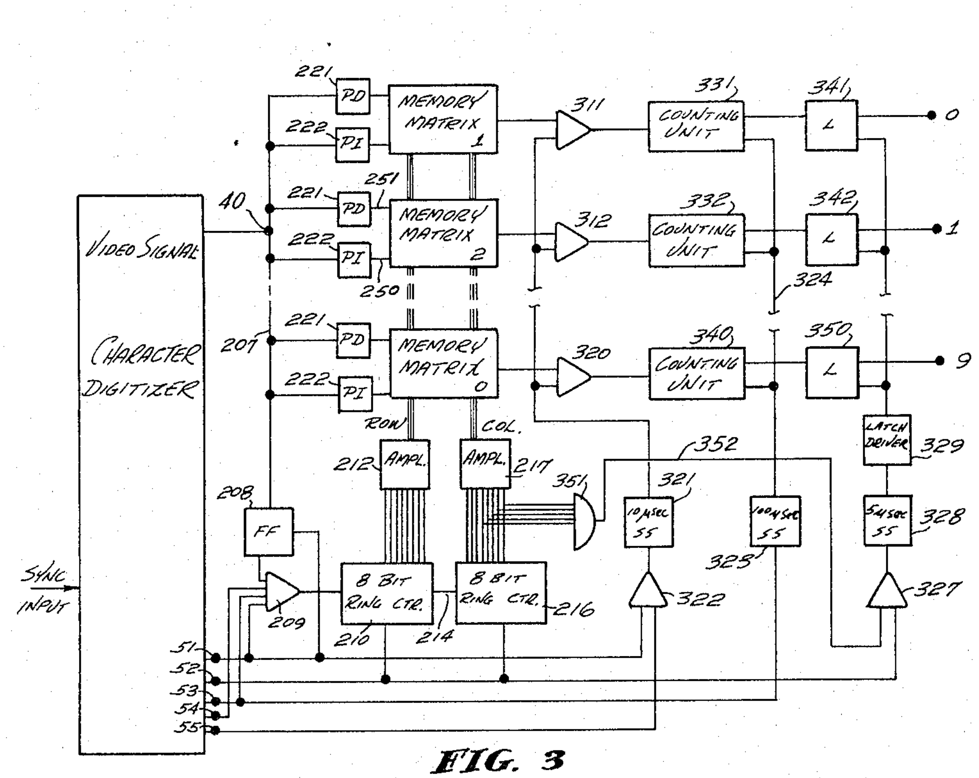
FIG. 3 is a schematic diagram of a first embodiment of the invention, in which various portions are shown in block form.
Figure 6:
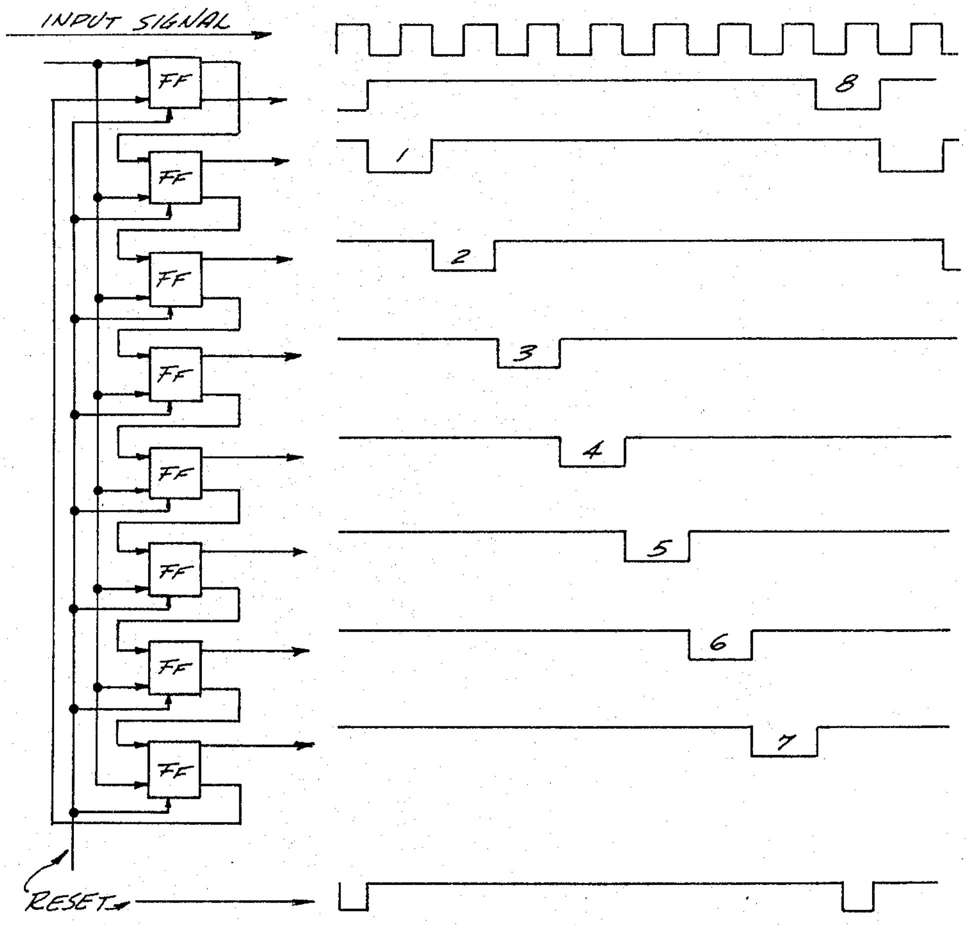
FIG. 6 is a pulse diagram illustrating the operation of timing means (a ring counter) which may be used in connection with the embodiment of the invention disclosed in FIG. 3.

Closure of AND gate 11 not only stops the stepping of ring counter 12, but also resets it to a reference position, its initial position. A circuit diagram and accompanying timing diagram of a ring counter suitable for use as counter 12 of FIG. 2, or counters 210 and 216 of FIG. 3, is shown in FIG. 6. The input signal to the counter is shown at the top of FIG. 6 and the counter will be seen to advance one count for each complete cycle of the timing signal. Counter 12 must be capable of being reset to its reference postion whenever its reset line is actuated, irrespective of the instantaneous count then registered in the counter. Counters of this type are well known in the art. It will be seen that stopping and resetting ring counter 12 whenever "black" has not been seen for a given length of time effectively stops vertical scanning, so that fewer vertical scans are used for narrow characters than for wide characters. Resetting counter 12 to a reference position is important in order to insure that all later characters be viewed in the same manner. It should be noted that irrespective of which photodiode first views the character leading edge, the scanning always begins from the same reference position of counter 12, and not from a position associated with the first photodiode to signal "black." Thus in the example given above, even though photodiode PX–2, the second photodiode in the viewing column, first views "black" on the numeral 2, the first photodiode (PX–1) is the first photosensitive element to be gated by counter 12 to tend to pass the photodiode video signal to OR gate 29, and if it were not for the fact that no photodiode video signals occurring during the initial scan are utilized in the specific embodiment shown, due to alternate scan gating, the output signal from OR gate 29 when scanning begun would comprise an initial "white" signal period from photodiode PX–1 while gate 21 was enabled, followed by the "black" signal period while gate 22 was enabled, and so forth, up through all eight steps, and then repeating. The use of a standard scanning pattern for all types of characters permits fewer bits to be stored in the machine memory to identify a given number of characters with a given accuracy.

An important feature of the digitizer system is the intentional non-use or disregard of the first scan particularly, and all subsequent odd-numbered scans of the character. It will be seen that the last or "eight" stage of counter 12 is connected through inverter 13 to operate trigger stage 14, the output of which is connected as a third input to AND gates 21–28. As the counter repeatedly cycles, each "eight count" will switch the state of trigger 14, thereby gating AND gates 21–28 first on and then off on successive vertical scans. The AND gates 21–28 thus will be closed during the odd-numbered scans but opened during the even-numbered scans, so that video information is passed through OR gate 29 solely during even-numbered scans. Ignoring the data derived from the *first* scan contributes importantly to accuracy and reliability, since it obviates many errors due to ragged leading edges of characters. It is well-known that variation in printing quality tends to drastically affect the edges of printed characters, due to type inking variations, worn type, changes in paper surface conditions and like variable conditions. In the specific embodiment shown, it was permissible to ignore the third and higher odd-numbered scans while still recognizing a limited vocabulary. In many embodiments of the invention it will be preferred to ignore the video data from solely the first scan. For example, flip-flop 14 instead may be connected to be reset by the inverted character gate signal from line 52 and set by the "column 2" line of column counter 216. Then gates 21–28 will be inhibited only during the initial scan. It also will be apparent that the inhibit signal may be applied to a single coincidence gate (not shown) fed from driver amplifier PD rather than to all eight AND gates 21–28, with some savings in components.

Horizontal registration is the matter of whether a reading machine will recognize a character properly if its horizontal position within the character area varies from an ideal or reference position. The invention overcomes the potential problem of horizontal registration by waiting until some black is viewed before initiating the reading process, thereby insuring a consistent reference line (along the left edge of each character) from which each scan is initiated relative to horizontal character position.

Character gate 11 is used to insure that proper lateral positioning of the character relative to the row of photodiodes obtains when vertical scanning is started. Since none of the signal circuits are actuated until one or more of the photodiodes see "black," vertical scanning does not begin till such time, and horizontal registration of horizontally moving characters therefore does not constitute a problem. It is important, however, that the document being read be transported past the reading head at a fairly constant, controlled speed. The machine document transport speed may be synchronized in a variety of well-known ways with the frequency of multi-vibrator MV. For example, a tone wheel on the mechanism may feed sync pulses to MV. In flying spot scanners, definition of the exact time at which the spot intercepts the character edge ordinarily requires extremely high scanner resolution.

Compensation for deviations from proper vertical registration may be accomplished in the memory portion of the invention, in a manner to be described below. Briefly, vertical registration tolerance is provided by using additional photocells above and below the nominal or usual character vertical position, and waiting until some "black" is seen during the *second* vertical scan of each character before beginning to analyze the scanning derived pulse train. It will be recalled that data derived during the first vertical scan is ignored. Because not vertical scanning begins until horizontal character position result in "black" being seen, and because pulse train analysis does not begin until vertical character position results in black being seen, it will be seen that the reference point at which every scanning-derived video waveform begins to be analyzed is constant for any given character in both vertical and horizontal directions.

*Matrix memory*

A block diagram of a first embodiment of the invention is presented in FIG. 3, wherein a bank of diode matrices are employed to store the vocabulary of characters to be read by the machine. Briefly, each pulse of the pulse train from the character digitizer is routed to a particular position in each matrix of the memory system. The matrix position is determined primarily by the location of the particular photodiode being read (i.e., the "row"), and by the number of the scan across the character, (i.e., the column). Depending upon whether the particular input pulse is in disagreement or agreement with the bit color designation in the various memory matrices, a pulse will be passed or not passed by the respective matrix to subsequent totalizing circuity. The subsequent totalizing circuitry keeps a tally of the error pulses by means of analog pulse counting circuits, and as the character gate is closed upon completion of the scanning of a character, a latch is set on the circuit with the then least count of error pulses.

As mentioned above, the system allows for an appreciable amount of vertical mis-registration of the character by numbering the bits, not from the first bit of the first even-numbered scan, but rather from the first "black" bit of that scan. This arrangement has the effect of moving the entire character up relative to the scanning matrix, and thereby presenting the same pattern to the matrix regardless of the vertical registration (or lack thereof) of the character with respect to the reading head.

Referring now in detail to FIG. 3, it will be seen that the first "black" video pulse of a pulse train from the character digitizer will set latch circuit or flip-flop 208 via terminal 40 and conductor 207. Latch 208 then feeds AND gate 209, which passes trigger or timing pulses from timing signal source MV to ring counter 210 upon concurrence or coincidence of output signals from latch 208 and alternate scan gate pulses from flip-flop or trigger 14, the alternate scan gate pulse deriving means shown in FIG. 2 and connected to apply alternate scan gate pulses via terminal 51. The timing pulses applied via terminal 54 then advance or step ring counter 210, the output leads of which drive the "row" inputs to the memory matrices through individual power driver amplifier stages shown collectively for convenience as a single multi-channel amplifier 212 in FIG. 3. The alternate scan gate signal is applied to AND gate 209 so that ring counter 210 will be advanced only during the even-numbered vertical scans. The maximum allowable number of vertical scans, and hence the maximum allowable character width for a given document transport rate and a given distance between scans, is determined by the number of stages provided in counter 210. An eight-stage counter will accommodate sixteen vertical scans. Because most characters fed to the device of FIG. 3 were entirely covered by ten vertical scans, counter 210 seldom advanced to a count greater than "five," after which it would be reset by the "lack of a character" signal on line 52. The last count of "row" ring counter 210 is connected via conductor 214 to advance "column" ring counter 216, which drives the column inputs to the memory matrices through individual power driver amplifiers shown collectively as amplifier 217. The "lack of a character" gate signal on conductor 52 used to reset digitizer ring counter 12 (FIG. 2) and row counter 210, also is connected as shown to reset column counter 216 to a reference position, so that counter 12 of the digitizer and counters 210 and 216 all will be reset to their initial or reference positions as soon as no character, i.e., no "black" has been viewed for a given (very brief) length of time, and therefore so that each subsequent scanning sequence will be performed in exactly the same manner.

The video signal from the digitizer on line 207 is fed to all character memory matrices in both direct and inverted form through power driver amplifiers such as 221, 221 and power inverter amplifiers such as 222, 222. A memory matrix is provided for each character or pattern that the machine is intended to recognize. For example, a typical machine might include twenty-six upper case letter matrices, twenty-six lower case matrices, ten numeral matrices and from five to ten punctuation and miscellaneous symbol matrices. Each of the horizontal lines of each matrix are connected to one or the other of the video input signals, depending upon whether the bit is intended to indicate "black" or "white" for its intended character. In cases where particular matrix bits well might be either black or white in a standard symbol, no connection need be made, so that the color of the particular bit remains unspecified for that particular character. In FIG. 4 each of the intelligence-deriving scans (i.e., each even-numbered scan) is divided into eight zones associated with the particular photodiodes which govern each portion of the scan, with each of the zones shaded in accordance with whether it would be wihte or black or uncertain for a properly registered character. For example, considering a numeral "2" of the type shown in FIG. 4, the forty zones of the five even-numbered scans used could be grouped as follows:

22 Probably White: All five $X_1$ zones, all five $X_8$ zones, $X_7Y_{10}$, $X_6Y_4$, $X_6Y_6$, $X_5Y_2$, $X_5Y_4$, $X_5Y_{10}$, $X_4Y_2$, $X_4Y_8$, $X_4Y_{10}$, $X_3Y_6$, $X_3Y_8$, $X_3Y_{10}$.
12 Probably Black: $X_7Y_2$, $X_7Y_4$, $X_7Y_6$, $X_7Y_8$, $X_6Y_8$, $X_5Y_8$, $X_4Y_6$, $X_3Y_4$, $X_2Y_2$, $X_2Y_4$, $X_2Y_6$, $X_2Y_8$.
6 Uncertain: $X_6Y_2$, $X_6Y_{10}$, $X_5Y_6$, $X_4Y_4$, $X_3Y_2$, $X_2Y_{10}$.

Figure 5:
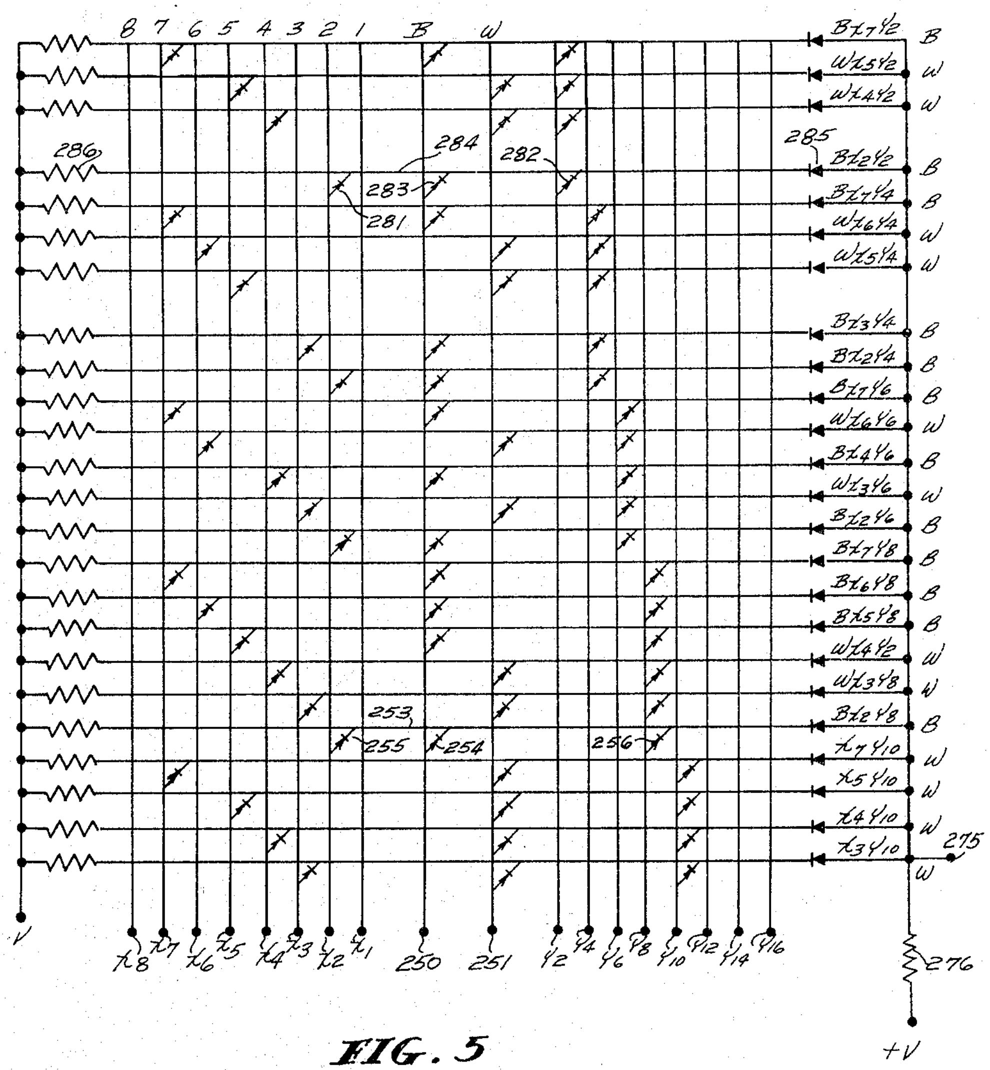
FIG. 5 is an electrical schematic diagram showing a memory matrix which may be used in the apparatus of FIG. 3 to recognize the numeral "2" when the latter is scanned in the manner shown in FIG. 4.

Referring now to the sample matrix of FIG. 5, which is connected to recognize the numeral "2," it will be seen that the video input signals from its associated driver and inverter amplifiers are applied via "black" and "white" video input terminals 250 and 251 shown at the bottom of the figure. Each horizontal line in the "2" matrix will be seen to be connected to either the inverted video input line 250 or the video input line 251, and also via two diodes to "row" and "column" inputs. Each horizontal line is a three-input AND gate which applies its output to a multi-input OR gate. A negative supply voltage-V is connected to the left side of each horizontal line via a respective resistance, and the right end of each line is connected through an individual diode to a common output terminal 275 which is connected through resistance 276 to a positive supply voltage +V. Each horizontal line of the matrix provides one input line to the diode OR gate, which produces its output signals on terminal 275.

During the second ($Y_2$) scan the first stage of column counter 216 will energize terminal Y2 of the matrix, and during eight successive portions of such vertical scan, row counter 210 will successively energize terminals X1 through X8 of the matrix.

Reference to FIG. 4 will indicate that during the scanning of a properly registered numeral "2," "black" should be viewed during the $X_2$ portion of the $Y_2$ scan. Therefore, the $X_2$ row input line, the $Y_2$ column input line and the inverted video signal line 250 all are connected through respective diodes (281, 282 and 283, respectively) to horizontal line 284 of the numeral "2" matrix shown in FIG. 5. Line 284 is connected via resistor 286 to a negative power supply terminal —V. The three diode inputs to line 284 form a conventional negative AND gate, so that line 284 stays at a given potential until such time that negative input signals are applied simultaneously to all three diodes. During the $X_2$ portion of the $Y_2$ scan, ring counters 210 and 216 apply negative signals from their "second" stages, which signals are inverted by the respective power driver amplifiers of 212 and 217. If "white" is seen during this time, a negative signal is present at inverted video terminal 250, resulting in a negative output potential on line 284. If a "black" video signal is available at inverted video terminal 250, no negative output signal is produced on line 284. Signals on line 284 are applied to a multi-input OR gate. A negative input pulse on line 284 increases current flow through diode 285 and resistor 276, thereby providing a negative output pulse at terminal 275. It is an important feature of the invention that output pulses are obtained from each symbol matrix solely at selected bit positions where the video signal *does not agree* with the bit polarity connection or "color" in the matrix, rather than providing output pulses whenever similarity existed.

As shown in FIG. 3, the output signals from each memory matrix, which signals may be termed "error pulses" or "difference signals," are applied to individual respective AND gates, such as gates 311, 312 . . . 320, to which fixed length clock pulses also are fed. The output signals from the AND gates therefore comprise precision error pulses made accurately uniform in both amplitude and period. The precision error pulses are totalized or counted by application to storage capacitors, to build up capacitor charges proportional to the number of error pulses applied. The totalizing or integrating circuits are discharged before each character is scanned, preferably during the first ($Y_1$) scan of each character.

In FIG. 3 the fixed-length clock pulses utilized to control AND gates 311, 312 . . . 320 are provided by a timing circuit shown as comprising a 10 mu sec. single-shot multivibrator 321, which, in turn, is controlled by AND gate 322. The alternate scan gate signal generated by flip-flop 14 (see FIG. 1) and present on line 51, and also the inverted timing signal from clock pulse source MV both are required to actuate AND gate 322 and single-shot multivibrator 321. Use of the alternate scan gate signal disconnects the pulse counters from their respective memory matrices during the odd-numbered scans, so that noise signals do not augment the count in the integrators during the odd-numbered scans. During each of the eight portions of each even-numbered scan, the inverted timing signal serves to reset timing circuit 321. Thus during each even-numbered scan, timing circuit 321 is operated eight times, to apply eight accurately measured 10 mu sec. pulses to AND gate 311, 312 . . . 320.

The precision error pulse counting circuits (331, 332 . . . 340) may comprise any one of many known conventional RC integrating circuits, or even digital counters, since the pulses are uniform in height and duration.

The character gate signal on line 53 is applied to control a further timing circuit 323 shown as comprising a 100 mu sec. single-shot multi-vibrator, which produces a 100 mu sec. reset pulse on line 324 during the first scan of a character, thereby re-setting to zero all the integrator or counter units (331, 332 etc.) as soon as the leading edge of an advancing character is encountered.

The inverted character gate signal on line 52 is connected, together with the output signal from OR gate 351 to AND gate 327, which is connected to pulse a further timing means shown as comprising 5 mu sec. single-shot multivibrator 328. A number of the highest order output lines of column counter 216 feed OR gate 351, so that a signal will be present on line 352 only if a character has been viewed for several vertical scans. Thus *if* a character has been viewed for several vertical scans *and* then "black" is no longer seen, the output signal from AND gate 327 will trigger multivibrator 328, which will switch on, or open, via latch driver 329, all of latch circuits 341–350 for a 5 mu sec. interval. At the end of the 5 mu sec. interrogation period, the output line of the particular latch associated with the totalizing unit having the least error remains activated, and all other latch output lines remain unactivated. This situation maintains until another character has been read. The details of a particular latch circuit of proven merit which has been used as latches 341–350 are shown in appl. Ser. No. 104,-897, filed April 24, 1961 by Elred H. Paufve, now Patent No. 3,166,679 and assigned to the same assignee as the present invention.

A respective latch circuit is provided for each character to be included in the machine vocabulary. The latch output line which is activated indicates the last character which has been identified. The latch output lines may be connected to a wide variety of output devices, to the input circuits of various computers and data-handling devices, and to desired display devices.

Figure 7:
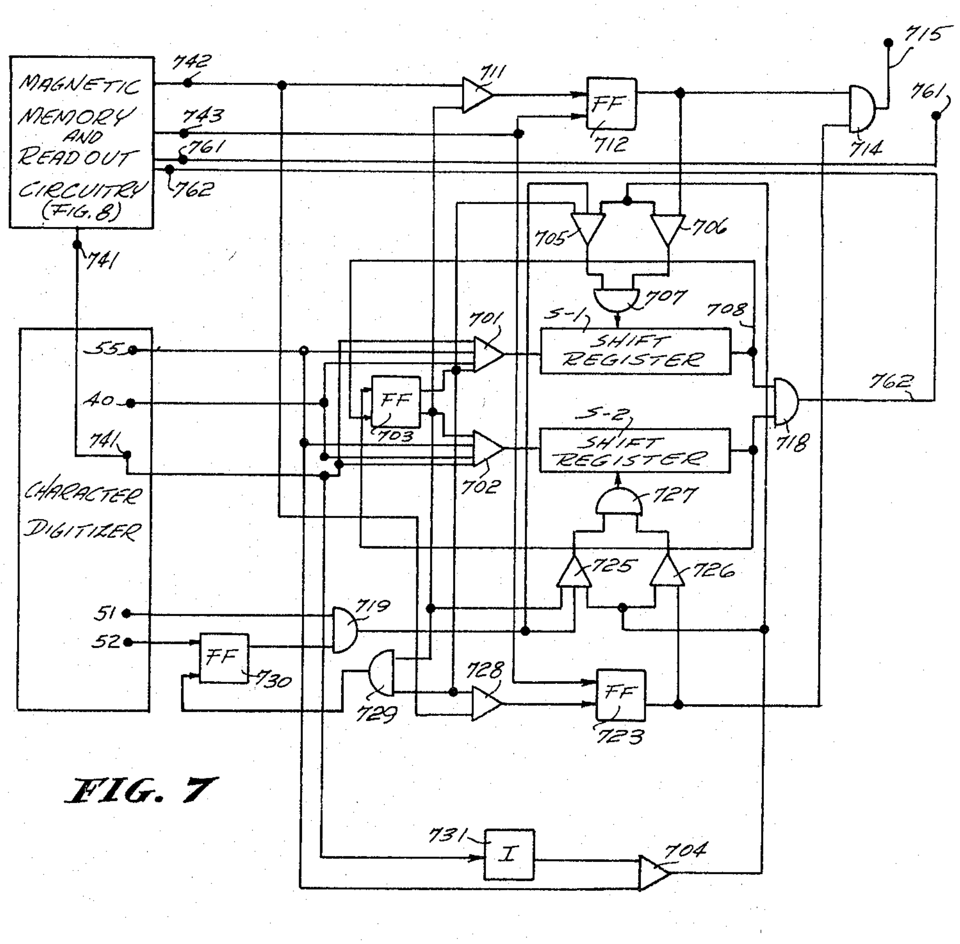
FIG. 7 is a schematic diagram of the intermediate memory portion of an alternative embodiment of the invention.

The alternative embodiment of the invention may use the character digitizer shown in FIG. 2, but in order to take advantage of its very economical storage capacity, a magnetic drum "active" memory system has been devised to use in place of the "inactive" matrix memory system illustrated in FIG. 5. The magnetic drum used in the alternate embodiment for storage of the complete machine vocabulary will be seen to constitute a variable access-time storage medium, since access-time to any given stored information depends upon the angular position of the given stored information in relation to the drum reading head position at the time when the given stored information is requested. Since the arrival time of video data from the character digitizer also varies with different characters and with character registration, means are provided to achieve synchronism between the drum and the character digitizer at some point (preferably the start) of each comparison cycle, and the intermediate memory means shown in detail in FIG. 7 accomplishes such a purpose. Shift registers S–1 and S–2 in FIG. 7 are connected by means of circuitry to be described so that video information previously stored in one shift register is being shifted out of the register to be compared with drum-stored information at the same time that the other shaft register is receiving further video information. In the alternative embodiment basic timing may be controlled by a synchronization signal read off the rotating magnetic drum, with multivibrator MV of FIG. 2 connected via terminal 741 to operate in synchronism with the drum. The drum drive preferably will be synchronized with the document transport means, in accordance with any one of a variety of well-known techniques.

Figure 9:
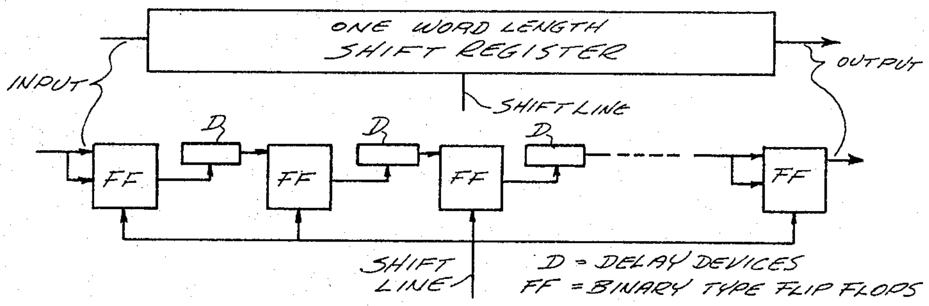
FIG. 9 is a block diagram illustrating an exemplary type of shift register useful in the intermediate memory system of FIG. 7.

As seen in FIG. 7 the video signal from terminal 40 of the character digitizer is applied to AND gates 701 and 702, each of which also receives the inverted timing signal on line 55 (FIG. 1), an inverted synchronization signal taken from the magnetic drum, and one output signal from flip-flop 703. Assume initially that the "1" output of bistable flip-flop 703 is negative, so that AND gate 701 will be opened, passing video signals through gate 701 into shift register S–1. Shift registers S–1 and S–2 may comprise conventional shift registers of a type shown in FIG. 9, wherein pulses applied on an input line may be advanced toward an output line by application of signals to a shift line. In FIG. 9 each stage of the shift register may be seen to comprise a binary type of flip-flop connected through a delay device to its adjacent stage. This video pulse train will be shifted through shift register S–1 by shift pulses applied to register S–1 via AND gates 704 and 705 and OR gate 707. The shift pulses are formed from combination at AND gate 704 of the inverted timing signal on line 55 of the character digitizer and the inverted synchronization signal taken from the magnetic drum (via terminal 741) to provide shift pulses which occur during the fourth quarter of the video pulse cycle. Because the third quarter of the video pulses are applied via AND gate 701 and the shift pulses occur during the fourth quarter of the video pulse cycle, a proper interlaced relationship will be obtained between video input pulses and shift pulses applied to shift register S–1.

Shift pulses will continue to be applied to register S–1 via gates 704, 705 and 707 until the first pulse applied to register S–1 reaches the end of the register. When the first pulse appears on shift register output line 708, it operates the reset line of flip-flop 703, closing gate 701 and opening gate 702, thereby readying shift register S–2 for reception of a pulse train characteristic of the next symbol to be scanned. The next video pulse train, when it occurs, then will be applied to load shift register S–2 via AND gate 702 in the same manner as described. At some time during the loading cycle of shift register S–2, the magnetic drum will arrive in proper position to initiate a comparison cycle. At this time a "word sync" pulse on line 742 derived from the magnetic drum (see FIG. 8) is applied via AND gate 711 to switch flip-flop 712, thereby providing a comparison gate signal in and out of OR gate 714. The comparison gate signal on line 715 is used as described below. During the initial part of the S–2 register loading cycle, the pulse train which had been shifted into register S–1 (so that its leading pulse had emerged at 708) will have remained stationary in register S–1, but upon initiation of the comparison cycle, the changed state of flip-flop 712, which is applied to open gate 706, now will connect shift pulses from gate 704 to register S–1 via AND gate 706 and OR gate 707, permitting the video pulse train stored in S–1 to emerge serially through OR gate 718. This irrespective of the character involved and its registration, the video pulse train derived from scanning the character will be stored in shift register S–1 until the drum is in proper position to initiate a synchronized comparison. Shift registers S–1 and S–2 alternate between "store" and "compare" modes as each new symbol is received. During alternate scans OR gate 719 controls AND gates 705 and 725, so that shift pulses will not be applied to either shift register during odd-numbered scans.

During "lack of a character" intervals, the inverted character gate signal on line 52 sets flip-flop 730, applying an output via OR gate 719 to prevent accidental application of shift pulses to either shift register when no character is being fed into a register. The output of OR gate 719 will prevent "loading shift" AND gates 705 and 725 from accidentally shifting registers S–1 and S–2, respectively, when no video signal is being fed in via terminal 40, but the OR gate 719 output will not prevent, however, the necessary application of shift pulses to registers S–1 and S–2 via "unloading shift" AND gates 706 and 726, respectively, when the drum arrives in position to render appropriate a comparison cycle. At the end of each character, the end of character gate signal on line 743 taken from the magnetic drum resets flip-flops 712 and 723, thereby discontinuing the comparison gate signal and preparing the intermediate memory circuit for the next character.

Both outputs of flip-flop 703 are connected through OR gate 729 so that flip-flop 730 will be reset during each transition of flip-flop 703 to define the trailing edge of the character.

Figure 8:
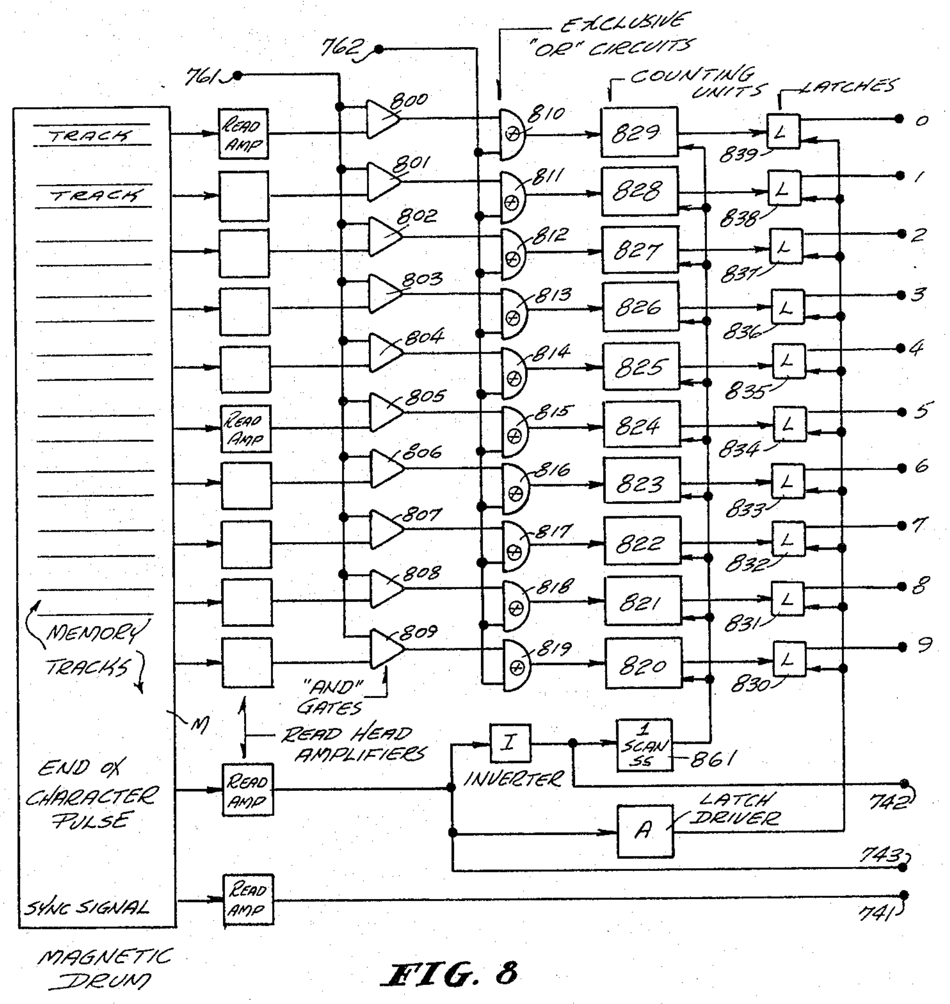
FIG. 8 is a block diagram of the main memory and comparison readout system of the alternative embodiment of the invention.

As seen in FIG. 8, a plurality of separate symbol tracks are provided on magnetic drum M, with a separate track for each symbol desired to be recognized, and with several additional synchronization tracks. The read head associated with each data symbol track is connected through a respective read amplifier to one input line of a respective AND gate, of the group 800–809 in FIG. 8. The compare gate signal on terminal 761 derived as explained above in connection with FIG. 7 is connected as another input to each of AND gates 800–809, thereby passing pulse trains read from the drum only during presence of the compare gate. The output signals from AND gates 800–809 are applied to individual "exclusive-OR" circuits 810–819, which provide output pulses only when their pairs of input pulses are non-coincident. Thus, only when a difference occurs between similarly located bits of the drum-derived pulse train and the scanning-derived pulse train is an output obtained from one of the exclusive-OR circuits. The outputs from the exclusive-OR circuits are counted by individual counting or totalizing units 820–829, and the counting unit outputs are connected to individual latch circuits 830–839. This circuitry may be identical to that of FIG. 3, except that synchronization signals preferably are derived from additional tracks on memory drum M. The "end of character" track provides a synchronization pulse, which inverted provides the "word sync" signal on terminal 742 required in FIG. 7 to initiate comparison intervals, and also resets all of the counting units to zero at the end of the character. The drum also provides a basic timing synchronization signal extending around the drum to control multivibrator MV of the character digitizer (FIG. 3).

Because the logic utilized in the magnetic drum embodiment is in no way dependent upon the type font or the graphic data to be read, the alternative embodiment is very versatile, and a variety of fonts and alphabets may be utilized with this embodiment. As disclosed in the Hemstreet applications, the memory drum may be loaded while scanning a reference vocabulary, using the same scanner to load the memory as will be used later to scan the material one wishes to have read. The invention accordingly comprises the features of construction, combination of elements, and arrangements of parts, which will be exemplified in the constructions hereinafter set forth, and the scope of the invention will be indicated in the claims.

We claim:

1. In character recognition apparatus, means for scanning a character to be recognized and for providing a bi-valued pulse train characteristic of said character, comprising, in combination: means for moving a document bearing characters to be read in a first direction; a plurality of photo-sensitive elements disposed in a row which extends in a second direction perpendicular to said first direction; means for generating a periodic timing signal; an electronic ring counter connected through a first coincidence gate to be advanced through successive counts by successive occurrences of said timing signal, said counter having a stage individual to each of said photo-sensitive elements; an OR gate having a plurality of input lines; a plurality of AND gates each having a first input line connected to a respective one of said photo-sensitive elements and a second input line connected to a respective stage of said counter to connect signals from successive of said photo-sensitive elements successively to respective ones of said input lines of said OR gate, thereby to provide serial output pulse trains from said OR gate; bi-stable switch means connected to be operated by said ring counter to change state during certain count conditions of said ring counter; and circuit means connecting said switch means to said AND gates to open and close said AND gates during predetermined count conditions of said ring counter.

2. In character recognition apparatus, means for scanning a character to be recognized and for providing a bi-valued pulse train characteristic of said character, comprising, in combination: means for moving images of characters on a document to be read in a first direction; a plurality of photo-sensitive elements disposed in a row which extends in a second direction perpendicular to said first direction intercepting said images; means for generating a periodic timing signal; an electronic ring counter connected through a first coincidence gate to be advanced through successive counts by successive occurrences of said timing signal, said counter having a stage individual to each of said photo-sensitive elements; an OR gate having a plurality of input lines; a plurality of AND gates each having a first input line connected to a respective one of said photo-sensitive elements and a second input line connected to a respective stage of said counter to connect signals from successive of said photo-sensitive elements successively to respective ones of said input lines of said OR gate, thereby to provide serial output pulse trains from said OR gate; and a second OR gate connected to each of said photo-sensitive elements to provide a third signal; and circuit means connecting said third signal together with said timing signal to operate said first coincidence gate.

3. Apparatus according to claim 1 having a second OR gate connected to each of said photo-sensitive elements to provide a third signal; first circuit means for connecting said third signal to said first coincidence gate; and second circuit means responsive to said third signal for resetting said ring counter and said bi-stable switch means to reference conditions.

4. Apparatus as defined by claim 2 wherein said image-moving means comprises a document transport for moving said document in said first direction.

5. In character recognition apparatus, means for identifying unknown pulse trains characteristic of scanned symbols, comprising, in combination: means for providing video signals varying in accordance with said pulse train; a plurality of memory matrices individual to symbols to be identified; a first electronic counter having $m$ stages; means for providing a periodic timing signal; means for providing a character presence signal; a first AND gate connected to receive said timing signal, and said character presence signal and operative to provide a fourth signal to advance said counter; a second electronic counter having $n$ stages, said second counter being connected to said first counter to be advanced one stage each time said first counter passes through all of its stages; each of said memory matrices comprising a plurality of three-input AND gates connected to feed a single multi-input OR gate, each of said three-input AND gates being connected to a respective one of said $n$ stages of said second electronic counter, one of said $m$ stages of said first electronic counter and to certain of said video signals.

6. Character recognition apparatus for identifying unknown pulse trains characteristic of scanned symbols, comprising, in combination: means for scanning a symbol with a plurality of successive vertical scans spaced across said symbol to provide video pulse trains characteristic of said symbol, each of said pulse trains having mutually opposite states representative of black and white scanned areas; a plurality of memory matrices connected to receive said pulse trains, each of said memory matrices having a plurality of row input lines and a plurality of column input lines, and a plurality of first output lines each individual to a particular pair of row and column lines; a first electronic ring counter connected to be advanced in synchronism with said scanning means after occurrence of the first black state signal to energize said row input lines successively; a second electronic ring counter connected to be advanced by one stage of said first ring counter to energize said column input lines successively, each of said first output lines comprising the output terminal of a three-input line AND gate connected to each of said ring counters and certain of said video pulse trains, each of said first output lines being connected as one input to an OR gate, the polarity of said video pulse trains being arranged with respect to said AND gates so that an output will be obtained from said OR gate only if the instantaneous bit of the character being scanned differs in sense from the corresponding matrix position bit of a reference character coded into the given memory matrix; means individual to each matrix for standardizing the output pulses from the OR gates of said memory matrices; and means operated upon the completion of scanning of a character to indicate which memory matrix produced the least number of output pulses.

7. Pulse train recognition apparatus, comprising, in combination: means for scanning a symbol and for deriving first and second serial pulse trains mutually opposite in polarity; a plurality of memory matrices each representative of an individual character, each of said matrices comprising a plurality of three-input-line AND gates, each of said AND gates being associated with a different bit position in said pulse trains, said first serial pulse train being connected as one input to a first group of said AND gates and said second serial pulse train being connected as one input to a second group of said AND gates, the connections of said first and second pulse trains being made to those AND gates whose bit positions result in a video signal representative of black and white respectively during standardized scanning of the individual character associated with a given memory matrix, a multi-input-line OR gate having the output from each of said AND gates connected to an individual input line; means for energizing the second and third input lines of said AND gates successively in synchronism with said serial pulse trains; and means for separately totalizing the output pulses from each of said OR gates of said memory matrices.

8. Apparatus according to claim 7 in which said means for energizing said second and third input lines of said AND gates comprise first and second ring counters, the individual stages of said first ring counter being connected to energize the second input lines of said AND gates and the individual stages of said second ring counter being connected to energize the third input lines of said AND gates.

9. Apparatus according to cliam 8 in which said second counter is connected to advance one stage each time said first counter cycles through all of its stages.

10. Apparatus according to claim 9 in which said first counter is connected to a timing signal through a further AND gate which is maintained closed until black area of a given symbol is scanned.

11. Apparatus according to claim 1 having comparison means operable to analyze said serial output pulse train to identify said character; and means for controlling said plurality of AND gates to disable said AND gates during all succeeding counts of the first cycle of said counter upon receipt of a signal from any of said photo-sensitive means, thereby to prevent application of signals to said OR gate during the initial scan of said character.

12. Apparatus according to claim 1 having means responsive to a signal from any of said photo-sensitive elements for enabling said first coincidence gate as long as signals continue to be received from any of said photo-sensitive elements, and for re-setting said ring counter to a reference state upon cessation of signals from all of said elements.

13. Character recognition apparatus, comprising: means for moving a document bearing characters to be read in a first direction; a plurality of photo-sensitive elements aligned in a second direction perpendicular to said first direction to view an area past which said document is transported, each of said elements being operable to produce an output signal when character area of a character on said document is imagined on said element; control means responsive to the presence of an output signal from any of said elements for sampling said elements individually and sequentially in a predetermined sequence and at a predetermined sampling rate and for applying the sample signals to an output pulse line, characterized in that said control means comprises a first OR gate connected to each of said elements to provide a first signal; means for deriving a periodic signal; a second OR gate; a plurality of coincidence gates connected between respective of said elements and said second OR gate; sequence means controlled by said periodic signals for individually and sequentially enabling said coincidence gates; and a further coincidence gate operative upon receipt of said first signal to apply said periodic signal to said sequence means.

14. In character recognition apparatus, a character digitizer operable to scan characters and to provide serial pulse trains characteristic of scanned characters, comprising, in combination: a scanning station comprising a plurality of photo-sensitive elements aligned in a first direction to view an area past which a document may be transported, each of said photo-sensitive elements being operable to produce an output signal which varies between a first level when character area of a portion of a character on said document is imaged on said element and a second level when background area of said document is imaged on said element; means for transporting a document bearing characters to be read past said area in a second direction perpendicular to said first direction; means responsive to said signals from said photo-sensitive elements for providing a first control signal whenever an output signal of said first level is obtained from any one or more of said photo-sensitive elements and sampling circuit means controlled by said first control signal and operable to sample the signal conditions of said photo-sensitive elements individually in a predetermined order and at a predetermined rate during the duration of said first control signal, the occurence of an output signal of said first level from any one or more of said photo-sensitive elements being operable to provide a first control signal which initiates operation of said sampling circuit means, and the absence of an output signal of said first level from all of said photo-sensitive elements being operable to provide a second control signal which resets said sampling circuit means to a reference condition.

15. Apparatus according to claim 14 in which said sampling circuit means includes timing signal generating means synchronized with said means for transporting a document.

16. Apparatus according to claim 14 in which said sampling circuit means is operable to apply the output signals sampled from said photo-sensitive elements to an output line and in which said sampling circuit means includes inhibiting circuit means to prevent the application of predetermined ones of said sampled signals to said output line.

17. A character recognition apparatus including a character digitizer for providing at an output terminal a train of pulses representative of indicia carried by a record member, said indicia exhibiting a first value of light reflectance and the remaining portion of said record member exhibiting a second value of light reflectance, comprising; means for moving said record member in a first direction relative to said apparatus; a plurality of photo-sensitive elements arranged in spaced relationship with said record member, each of said elements providing a first electrical signal in accordance with said first value of light reflectance and a second electrical signal in accordance with said second value of light reflectance; and control means for sequentially coupling the electrical signals provided by all of said plurality of elements individually to said output terminal of said digitizer only during time intervals when at least one of said elements provides a first electrical signal.

18. The apparatus of claim 17 including circuit means responsive to said control means for inhibiting the coupling of said electrical signals to said output terminal during at least one predetermined portion of each of said time intervals.

No references cited.

MAYNARD R. WILBUR, *Primary Examiner.*

J. E. SMITH, *Assistant Examiner.*